Sept. 5, 1939.  W. BÜSCHING  2,172,058

PROCESS FOR THE CONCENTRATION OF CORROSIVE SUBSTANCES

Filed Nov. 18, 1936

Inventor:
WILLI BUSCHING
BY Haseltine, Lake & Co.
Attorneys

UNITED STATES PATENT OFFICE 2,172,058

PROCESS FOR THE CONCENTRATION OF CORROSIVE SUBSTANCES

Willi Büsching, Dolau-Halle, Germany

Application November 18, 1936, Serial No. 111,505
In Germany June 2, 1934

4 Claims. (Cl. 23—169)

The invention relates to a process for the high concentration of corrosive substances, such as sulphuric acid, in apparatus in which the acid flowing, for example, from a preliminary concentration plant, especially a dephlegmator, is heated to boiling temperature in a closed cast-iron or other vessel.

Plants of this nature are already known, in which the dilute sulphuric acid flowing from a dephlegmator is introduced by a low introduction pipe into a closed cast-iron vessel. In these plants, the deep introduction pipe is of such small dimensions that in the case of a flow of somewhat large quantities of acid considerable quantities of water enter the concentration vessel and must be eliminated therein. The vapours thus accumulating above the liquid level, which contain large proportions of water vapour, very actively attack the cast iron, particularly in the outer zone of the liquid surface and in the vapour zone.

This drawback is obviated by the present invention by reason of the fact that in the construction of the apparatus used and the carrying out of the process care is systematically taken that no water passes into the bath acid situated in the concentration vessel, which is therefore of 98 to 98.5% concentration. To achieve this object, according to the present invention the deep introduction pipe has a relatively large cross section and the size of the deep introduction pipe, the quantity of the preliminarily concentrated sulphuric acid entering and the speed of the stirring are such that the concentration of the acid takes place in the deep introduction pipe washed by the hot, highly concentrated bath acid itself. The sulphuric acid therefore passes out of the lower end of the deep introduction pipe practically with the same temperature and consequently with the same concentration as the bath acid in the vessel. By the arrangement of a stirring mechanism, provision is made for a sufficient heat exchange between the preliminarily concentrated acid entering the deep introduction pipe and the bath acid. The stirring mechanism may be arranged at the side of the deep introduction pipe in the vessel, or it may be situated in the deep introduction pipe itself. In this case, it is preferable to arrange two stirring blades of opposite pitch on the shaft of the stirring mechanism, the shaft being passed partially through the deep introduction pipe. The pitch of the upper stirring blade arranged in the deep introduction pipe is then preferably such that it tends to raise the acid in the deep introduction pipe, in order thus to lengthen the period during which the acid remains in the deep introduction pipe and to effect a strong whirling of the acid to facilitate elimination of the water vapour. The lower stirring blade turning above the bottom of the vessel is intended chiefly for the removal of the impurities from the concentration vessel by agitation and tends at the same time to move the acid flowing out of the deep introduction pipe in the opposite direction to the upper stirring blade.

The vapours having a high content of water which are produced in the deep introduction pipe in the concentrating operation together with the vapours rising from the vessel are directly withdrawn into the dephlegmator and effect the preliminary concentration therein in a known manner. Owing to the fact that the preliminarily concentrated acid entering the deep introduction pipe is gradually brought by the bath acid washing the pipe to the boiling temperature of acid of 98 to 98.5% concentration, a very uniform, uninterrupted concentration of the acid takes place. Decomposition of the bath acid by the vigorous boiling hitherto necessary and the superheating of the vapours easily occurring therewith are obviated.

In this way, it is possible to obtain in a continuous process, with good heat exchange, highly concentrated sulphuric acid (of about 98 to 98.5% concentration. Corrosion of the wall of the boiler by water vapour is practically obviated. The parts of the deep introduction pipe attacked by the water vapours are readily exchangeable. As the deep introduction pipe cannot be affected by gases of combustion, it is possible to use a highly silicated iron alloy for this structural part which is particularly exposed to corrosion.

The high concentration plant is illustrated in two constructional examples in the accompanying drawing in which.

Figure 1:
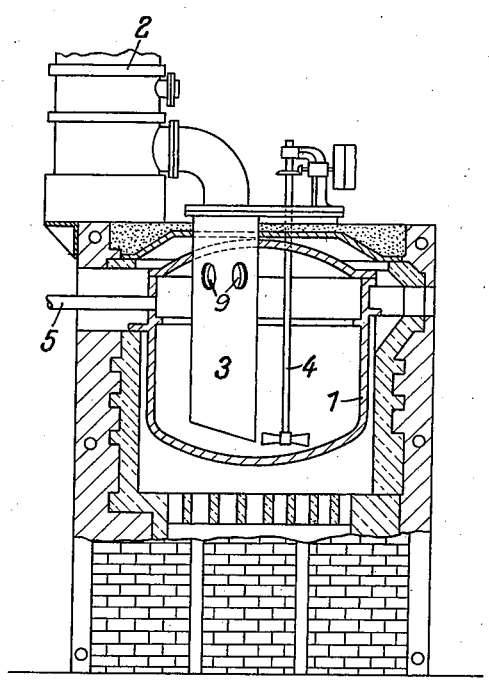
Figure 1 is an elevation of the plant, partially in section.

The concentration plant consists of a vessel 1, into which the acid preliminarily concentrated in the preliminary concentration plant, namely, in the dephlegmator 2, passes through the deep introduction pipe 3. The vessel is heated either by direct firing, as illustrated in the drawing, or by indirect firing. In the vessel a stirring mechanism 4 operates with the object of preventing the impurities separated in the concentration from being deposited. The high concentrated acid flows away through the overflow pipe 5. The wall area of the deep introduction pipe is made so great that the acid flowing into the deep introduction pipe from the dephlegmator is concentrated therein and passes into the vessel in concentrated form. The preliminary concentration of the acid in the dephlegmator 2 is effected by the vapours passing from the deep introduction pipe into the dephlegmator and by the acid vapours which are formed in the concentration vessel also passing into the dephlegmator through apertures provided in the upper portion of the introduction pipe.

Figure 2:
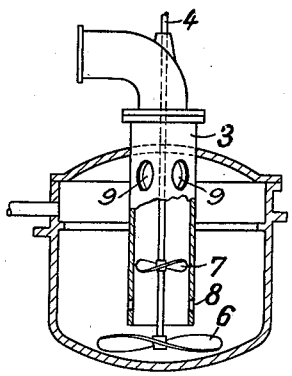
Figure 2 is an elevation of another arrangement of the deep introduction pipe and the stirring mechanism, partially in section.

In the constructional form illustrated in Figure 2, the stirring mechanism passes through the centre of the deep introduction pipe and next to the stirring blade 6 turning on the bottom of the concentration vessel a second stirring blade 7 is provided in the deep introduction pipe itself. The stirring blades are preferably of opposite pitch, so that the blade situated in the deep introduction pipe tends to raise the acid therein, while the stirring blade turning above the bottom of the vessel tends to move the acid flowing in out of the deep introduction pipe in the opposite direction. In order to prevent a too rapid discharge of the acid situated in the deep introduction pipe under the influence of the stirring blade 6, there are also provided in the lower part of the deep introduction pipe slits or apertures 8 through which the bath acid may enter the deep introduction pipe laterally. A continuous mixing of the bath acid with the acid situated in the lower part of the deep introduction pipe is thus effected, while at the same time a good heat exchange is ensured.

The following specific process for the concentration of sulphuric acid is given by way of example only:

For the concentration of impure 70% sulphuric acid, a cast-iron boiler having an internal diameter of 2500 mm. and a height of about 2.00 m. is used, which is provided with a stirring mechanism. The acid flowing from a preliminary concentration plant known per se, for example a dephlegmator and having a concentration of about 94-95%, passes through a deep introduction pipe, which is passed through the cover of the boiler, into the bath acid. The deep introduction pipe has an internal diameter of 300-400 mm. and is preferably constructed of a non-corrosive substance, for example high percentage silicon iron. With the said plant, about 28 to 30 tons of sulphuric acid of about 70% may be concentrated to 98-98.3% in 24 hours. The coal consumption in reference to the concentrated acid obtained amounts to about 9.3% to 10% when coal of medium quality is used, such as coal having a heating value of approximately 13,500 B. t. u. The indicated percentage is calculated by first computing from the amount of coal actually consumed and its heating value the quantity of mineral coal of 13,000 B. t. u. containing the same amount of heat. This quantity of mineral coal is then compared with the quantity of concentrated sulfuric acid of 98 or 98.3% that has been obtained, and the percentage established. The 70% acid running into the dephlegmator is preliminarily concentrated in this concentration plant and then passes with a now small water content into the deep introduction pipe. In this deep introduction pipe, the residual quantities of water are eliminated, so that the acid flowing into the boiler at the end of the deep introduction pipe has the concentration of the boiling bath acid (that is, 98 to 98.3%). The acid loss amounts to about 0.5%.

What I claim as new, is:

1. In a process for the concentration of sulfuric acid the steps of preliminarily concentrating the acid to about 94%, passing this acid through a wide introduction pipe into a closed vessel and introducing the acid at the bottom of said vessel, maintaining a substantial body of acid in the vessel surrounding the pipe and in heat exchange relation with the acid in the pipe, heating the acid in the vessel, concentrating the acid mainly in said pipe by regulating the heating and rate of introduction of the acid so that the acid leaving the introduction pipe is concentrated to about 98%, withdrawing acid from the vessel and withdrawing vapors from the heated acid through the introduction pipe.

2. Apparatus for highly concentrating sulphuric acid, comprising a closed iron vessel, a wide deep introduction pipe extending down into said vessel to the bottom thereof, having a transverse diameter about ⅛ of that of the vessel and connected exteriorly to a dephlegmator, the lower end of said pipe being open and there being outlet apertures in the upper portion of the pipe within said vessel for the vapors produced in the latter, and stirring mechanism in said apparatus for stirring the acid.

3. Apparatus according to claim 2, wherein the stirring mechanism is concentric with the portion of the introduction pipe located within the vessel.

4. Apparatus for highly concentrating sulphuric acid, comprising a closed iron vessel, a wide deep introduction pipe extending down into said vessel and connected exteriorly to a dephlegmator, there being an outlet opening for the acid in the lower end of said pipe and outlet apertures in the upper portion of the pipe within said vessel for the vapors produced in the latter, and stirring mechanism concentrically disposed in said apparatus with the portion of the introduction pipe located within the vessel and serving to stir the acid, said stirring mechanism comprising a shaft extending downwardly through said introduction pipe and provided with two stirring means having blades, one of said stirring means being located in the lower portion of said vessel and the other stirring means being located within the introduction pipe and capable of raising the portion of the acid with which it comes in contact in the same.

WILLI BÜSCHING.